(12) United States Patent
Akenhead et al.

(10) Patent No.: US 12,279,596 B2
(45) Date of Patent: Apr. 22, 2025

(54) INTERCHANGEABLE HARNESS SYSTEM

(71) Applicant: Ray Allen Manufacturing, LLC, Denver, CO (US)

(72) Inventors: Matt Akenhead, Bedford, VA (US); Matt Wilson, Peyton, CO (US); Billy Travis, Peyton, CO (US)

(73) Assignee: Ray Allen Manufacturing, LLC, Colorado Springs, CO (US)

( * ) Notice: Subject to any disclaimer, the term of this patent is extended or adjusted under 35 U.S.C. 154(b) by 157 days.

(21) Appl. No.: 16/916,028

(22) Filed: Jun. 29, 2020

(65) Prior Publication Data

US 2020/0404887 A1 Dec. 31, 2020

Related U.S. Application Data

(60) Provisional application No. 62/868,079, filed on Jun. 28, 2019.

(51) Int. Cl.
*A01K 27/00* (2006.01)
*A01K 13/00* (2006.01)

(52) U.S. Cl.
CPC .......... *A01K 27/002* (2013.01); *A01K 13/006* (2013.01)

(58) Field of Classification Search
CPC .......................... A01K 27/002; A01K 13/006
See application file for complete search history.

(56) References Cited

U.S. PATENT DOCUMENTS

| | | | | |
|---|---|---|---|---|
| 660,414 A | * | 10/1900 | Carli | A01K 13/008 54/79.2 |
| 785,021 A | * | 3/1905 | Reid | |
| 5,531,187 A | * | 7/1996 | Ward | B62J 11/20 119/856 |
| 5,887,772 A | * | 3/1999 | Dooley | A01K 27/008 119/858 |
| 5,970,921 A | * | 10/1999 | Fulton | A01K 27/006 119/858 |
| 5,996,537 A | * | 12/1999 | Caditz | A01K 13/008 54/79.1 |
| 6,694,923 B1 | * | 2/2004 | Fouche | A01K 27/005 119/792 |
| 9,332,734 B1 | * | 5/2016 | Hege | A01K 13/006 |
| D920,595 S | * | 5/2021 | Dusev | A61D 3/00 D30/152 |
| 2010/0199927 A1 | * | 8/2010 | Cigard | A01K 13/00 119/850 |
| 2013/0327282 A1 | * | 12/2013 | Sebo | A01K 27/006 119/850 |
| 2015/0020752 A1 | * | 1/2015 | Zimmerman | A01K 27/002 119/856 |

(Continued)

FOREIGN PATENT DOCUMENTS

| | | | | |
|---|---|---|---|---|
| DE | 202010016579 U1 | * | 6/2011 | ........... A01K 27/002 |
| FR | 2628290 A1 | * | 9/1989 | |
| FR | 2883451 A1 | * | 9/2006 | ........... A01K 13/006 |

*Primary Examiner* — Peter M Poon
*Assistant Examiner* — Hae Rie Jessica Byun
(74) *Attorney, Agent, or Firm* — Ice Miller LLP

(57) ABSTRACT

An interchangeable dog harness that includes an upper frame, a lower frame, and an interchangeable cape, wherein the upper frame and lower frame are adjustable to accommodate various dog sizes, and the interchangeable cape is designed to be used in a variety of situations the dog may face.

7 Claims, 13 Drawing Sheets

(56) References Cited

U.S. PATENT DOCUMENTS

| | | | | |
|---|---|---|---|---|
| 2016/0015003 A1* | 1/2016 | Watson | ................ | A01K 1/0263 |
| | | | | 224/600 |
| 2017/0258040 A1* | 9/2017 | Bang | ........................ | A61D 3/00 |
| 2018/0116175 A1* | 5/2018 | Lui | ....................... | A01K 27/002 |
| 2019/0364847 A1* | 12/2019 | Mills | .................... | A01K 27/002 |
| 2020/0205379 A1* | 7/2020 | Leek | ........................ | B62J 11/20 |
| | | | | 119/856 |

\* cited by examiner

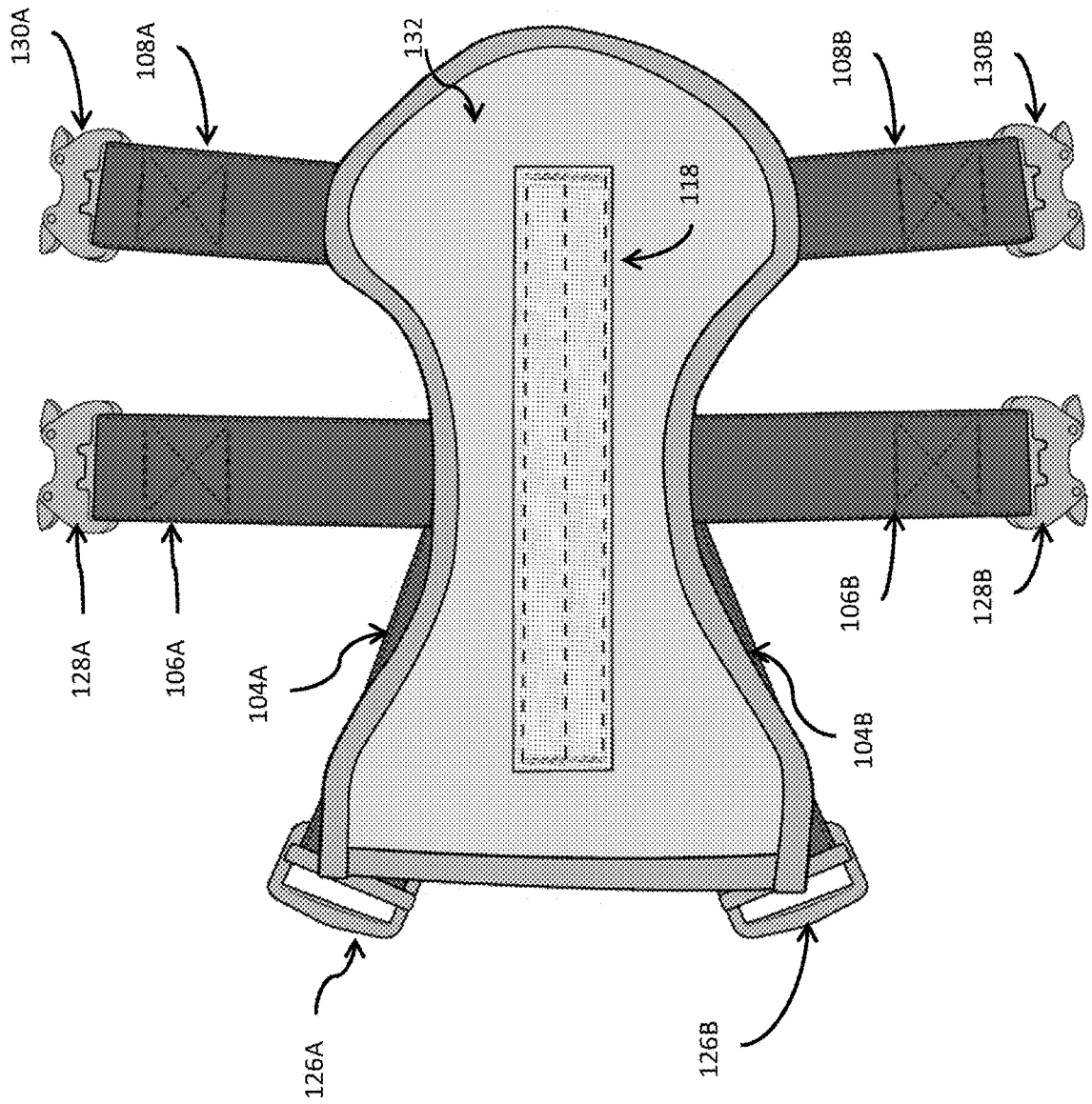

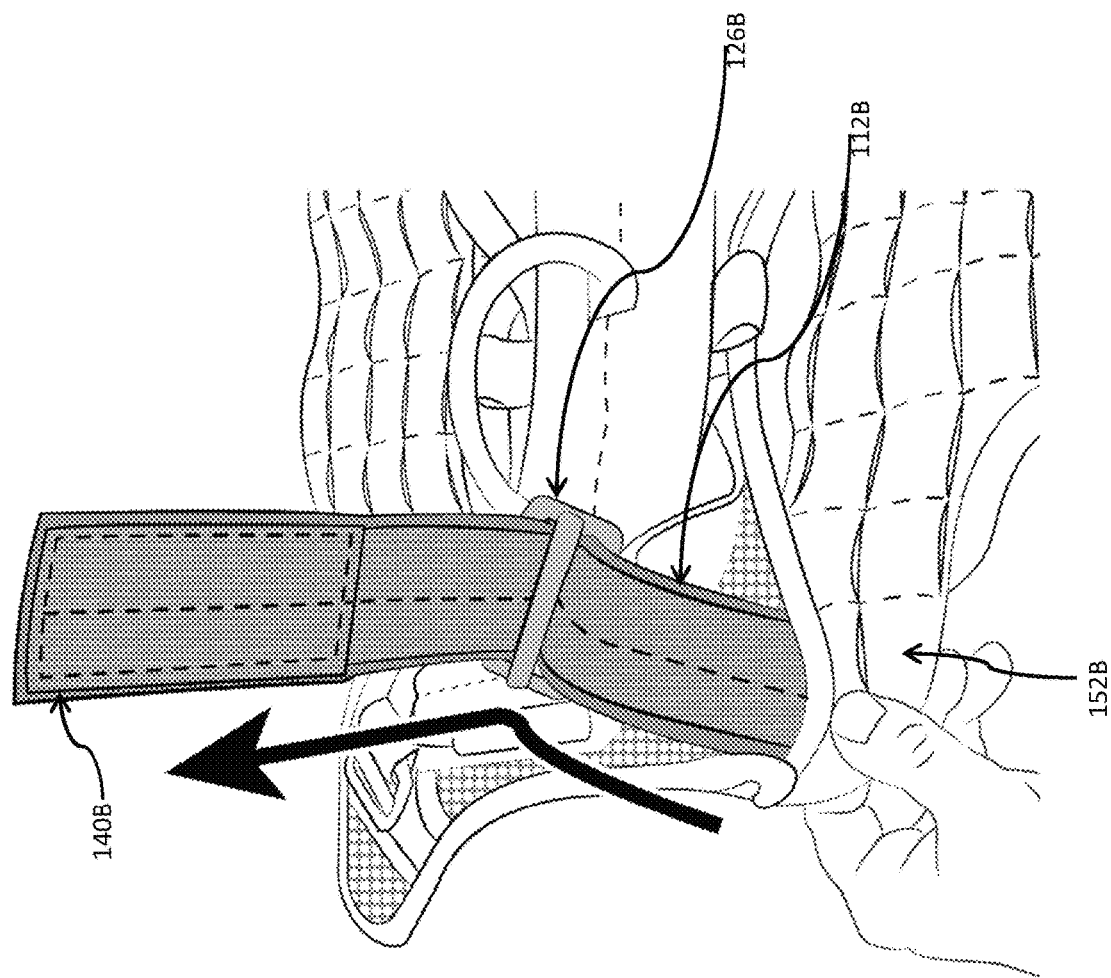

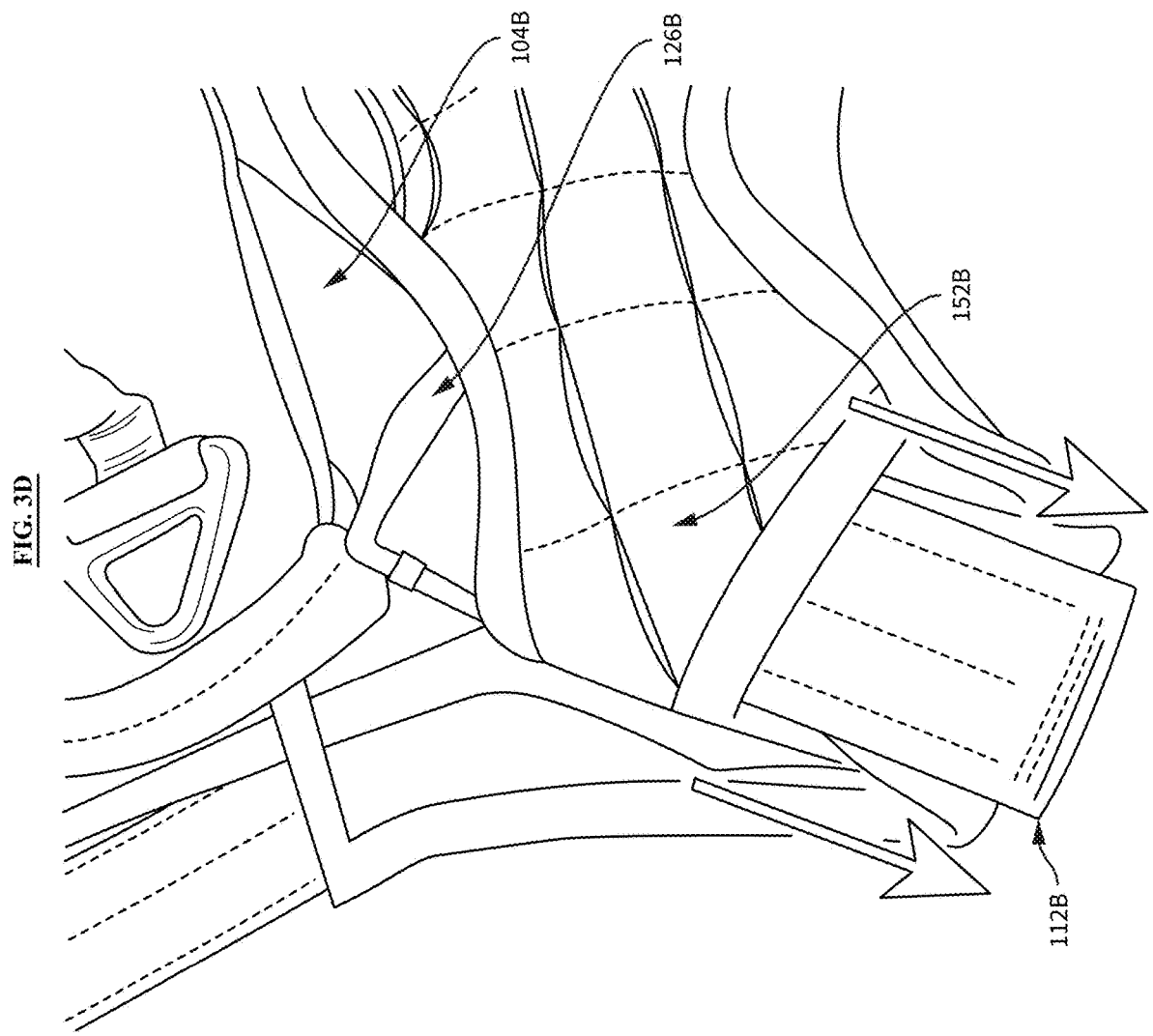

INTERCHANGEABLE HARNESS SYSTEM

PRIORITY

This utility patent application claims priority to U.S. Provisional Patent Application No. 62/868,079, filed Jun. 28, 2019, which provisional is incorporated by reference herein in its entirety.

TECHNICAL FIELD

The present disclosure relates in general to dog harnesses, and specifically, to an interchangeable harness system.

BACKGROUND

Dog harnesses are common equipment used by dog handlers. From civilians, to police and first responders, to military personnel, harnesses are used in a variety of contexts and serve a variety of functions. Most commonly, harnesses are used for providing additional bodily protections to dogs, to enhance a dog's capabilities, or to help enable humane handling protections of dogs. By way of examples, some harnesses may provide climate protections to a dog (e.g. warmth protection); other harnesses may provide increased visibility; or, others may provide buoyancy capabilities.

Traditionally, dog handlers end up owning multiple harnesses to meet varying situational needs as each harness type is usually purpose-built to address a particular situation. For example, a dog owner on a mountain climbing adventure with their dog may use a repelling harness, but then would subsequently need a buoyancy compensator harness (i.e. a swim vest) for the dog if they engage in water based activities (e.g. kayaking). Similarly, a police K9 unit may need a ballistic harness for a K9 officer's protection in volatile situations, but, may subsequently change into a traditional patrol harness for street patrolling activity; or, may need a high visibility harness in search and rescue (SAR) operations.

In any case, the varying situational needs are often fulfilled by specialized and purpose-built harness. Such harnesses may further utilize different styles of hardware, materials, structure, design, and placements of fasteners. In addition, these harnesses are fit for a singular purpose, and cannot be re-purposed to fit other needs or applications beyond their original purpose and design. In the examples above, each situation would require the respective dog owner to purchase purpose-built harnesses for each situation, which can become expensive.

SUMMARY

The present disclosure relates to an interchangeable harness system that includes an upper frame, a bottom frame, and a cape. In at least one embodiment of the present disclosure, the interchangeable harness system is constructed to be mounted on an animal (e.g. dog) using straps at a chest location, and at a girth location.

In at least one embodiment of the present disclosure, the upper frame includes an upper chest strap, an upper girth strap, and an upper rib strap. In at least one embodiment of the present disclosure, the bottom frame includes a bottom chest strap, a bottom girth strap, and a bottom rib strap.

In at least one embodiment of the present disclosure the cape includes a pair of chest slots and coupling strip, the each of the pair of chest slots are constructed to receive lower chest straps.

In at least one embodiment of the present disclosure, the cape is constructed to meet demands of at least one of a variety of different situations that a dog may encounter, and different can be interchangeably used with the same upper frame and lower frame.

BRIEF DESCRIPTION OF DRAWINGS

FIG. 2C is a drawing of the underside view of the upper portion of the frame of the interchangeable harness system, according to at least one embodiment of the present disclosure.

FIG. 3C is a drawing of a strap of the interchangeable harness system, according to at least one embodiment of the present disclosure.

FIG. 3D is a drawing of a closure of the strap of the interchangeable harness system, according to at least one embodiment of the present disclosure.

DETAILED DESCRIPTION

Reference will now be made in detail to the preferred embodiments of the present disclosure, examples of which are illustrated in the accompanying drawings. Additional features and advantages of the disclosure will be set forth in the description that follows, and will be apparent from the description, or may be learned by practice of the disclosure. It is to be understood that both the foregoing general description and the following detailed description are exemplary and explanatory and are intended to provide further explanation of the disclosure as claimed.

It will be appreciated that the interchangeable harness system includes various belt elements and coupling elements, as further disclosed herein. The coupling and fastening components are designed as rings or other connecting elements as hooks, snap hooks, flat carabiner, cobra buckles, and the like, as would be well known to one having ordinary skill in the art. It will be further appreciated that the coupling and fastening components and the associated connecting components are designed as plug-click closure or buckles, wherein the coupling and fastening components have simple and easy operability as would be well known to one having ordinary skill in the art, and as further disclosed herein.

It will be appreciated that the interchangeable harness system disclosed herein may be constructed for materials well known to one having ordinary skill in the art, and for the purposes disclosed herein, such as, for example, stainless steel, chrome, titanium, plastic, polyester, rayon, Kevlar, nylon, leather, polyurethane and the like.

Figure 1A:
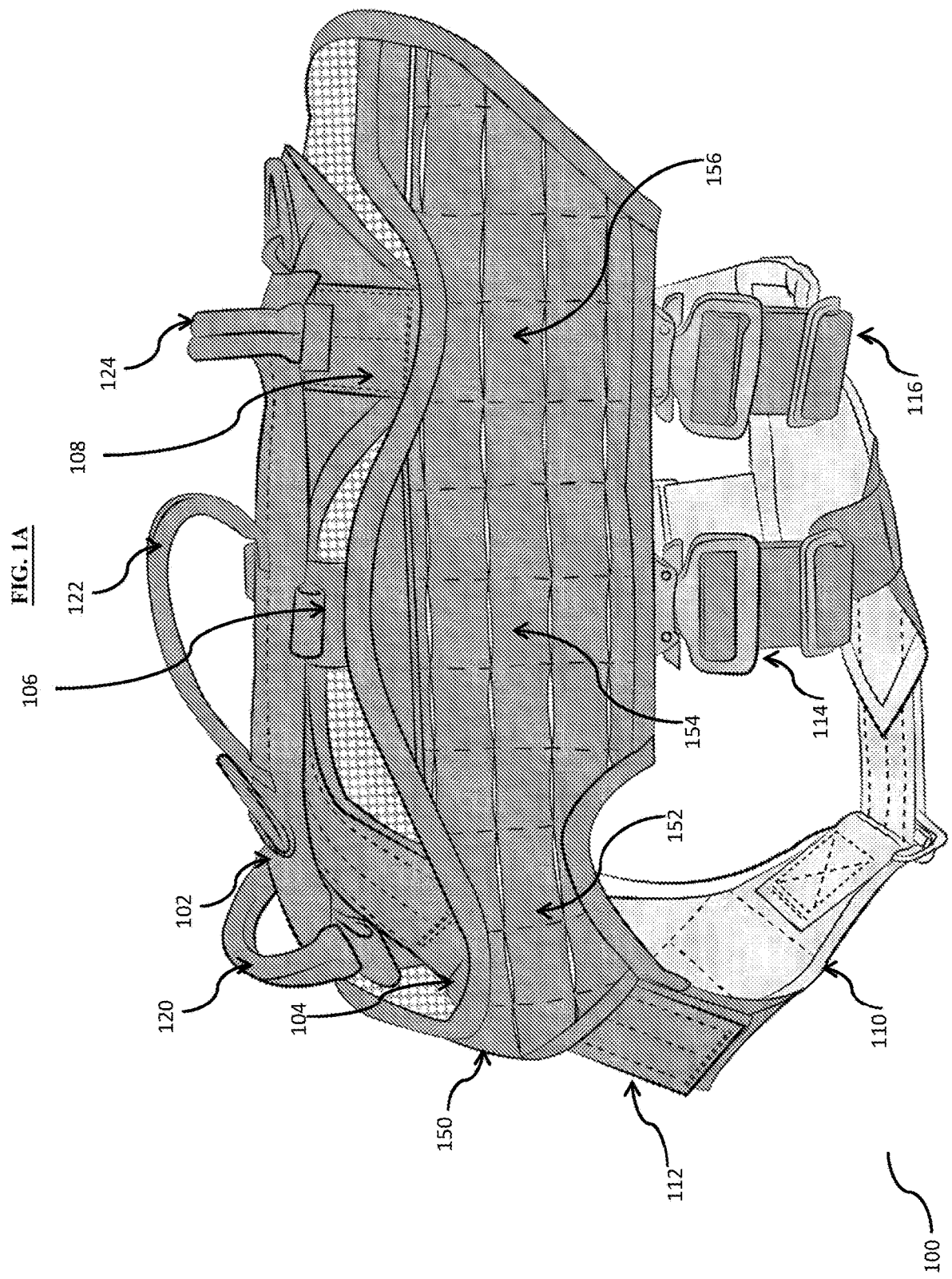
FIG. 1A is a drawing of an interchangeable harness system, according to at least one embodiment of the present disclosure.

Referring now to FIG. 1A, there is shown an interchangeable harness system 100, according to at least one embodiment of the present disclosure. The interchangeable harness system 100 includes an upper frame 102, a bottom frame 110, and a cape 150.

Figure 1B:
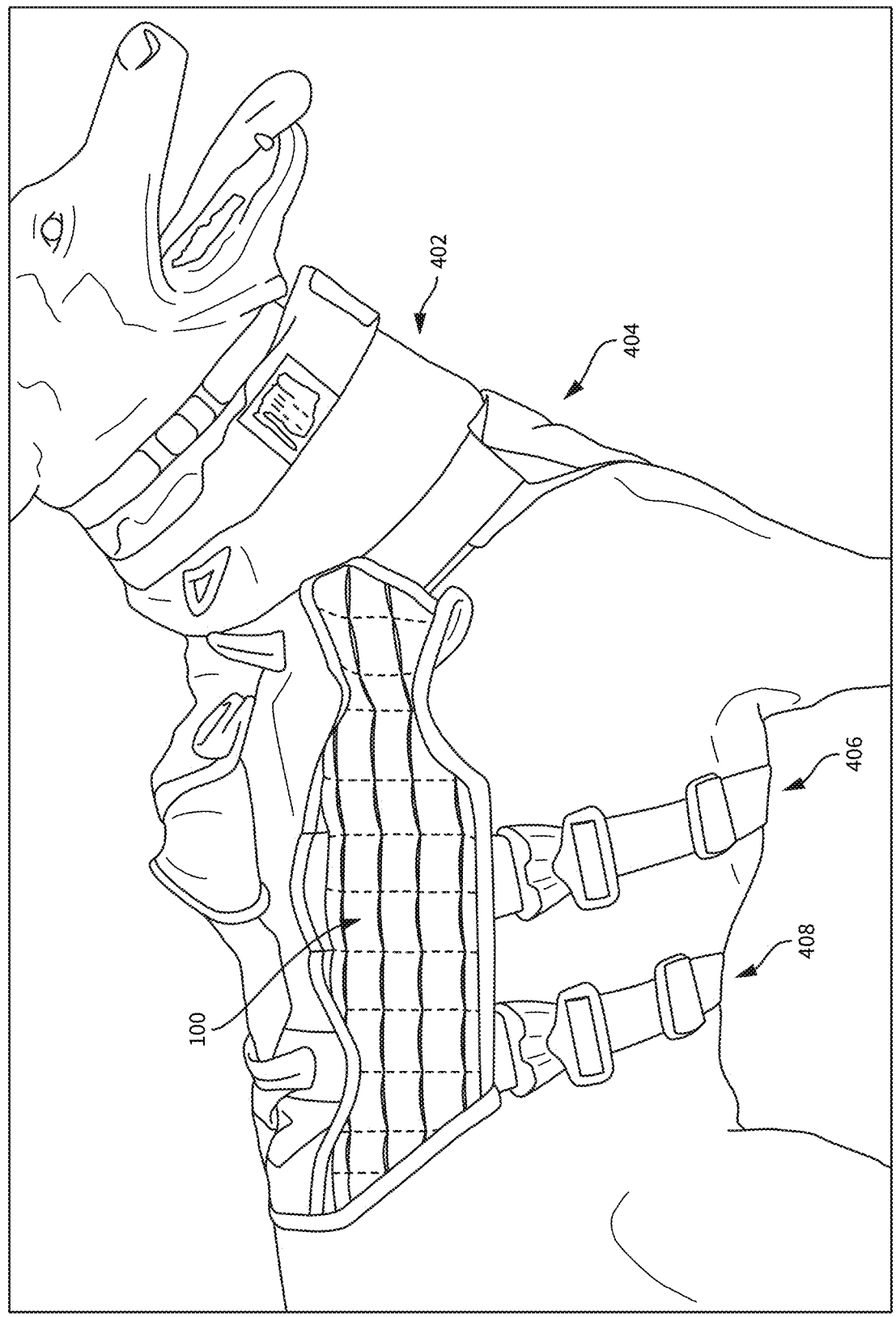
FIG. 1B is a drawing of an interchangeable harness system harnessed to a dog, according to at least one embodiment of the present disclosure.

In at least one embodiment of the present disclosure, the interchangeable harness system 100 is constructed to be harnessed to a dog, as shown in FIG. 1B. The interchangeable harness system 100 is constructed to be mounted on the dog 402 using straps at the chest location 404, at the girth location 406 and the rib location 408. It will be appreciated that the interchangeable harness system 100 may be harnessed to dog 402 at just the chest location 404 and girth location 406, without the use of straps at rib location 408. It will be further appreciated that the interchangeable harness system 100 may be harnessed to dog 402 at just the chest location 404 and rib location 408, without the use of straps at girth location 406; or, the interchangeable harness system 100 may be harnessed to dog 402 at just the chest location 404 and girth location 406, without the use of straps at rib location 408.

Figure 2A:
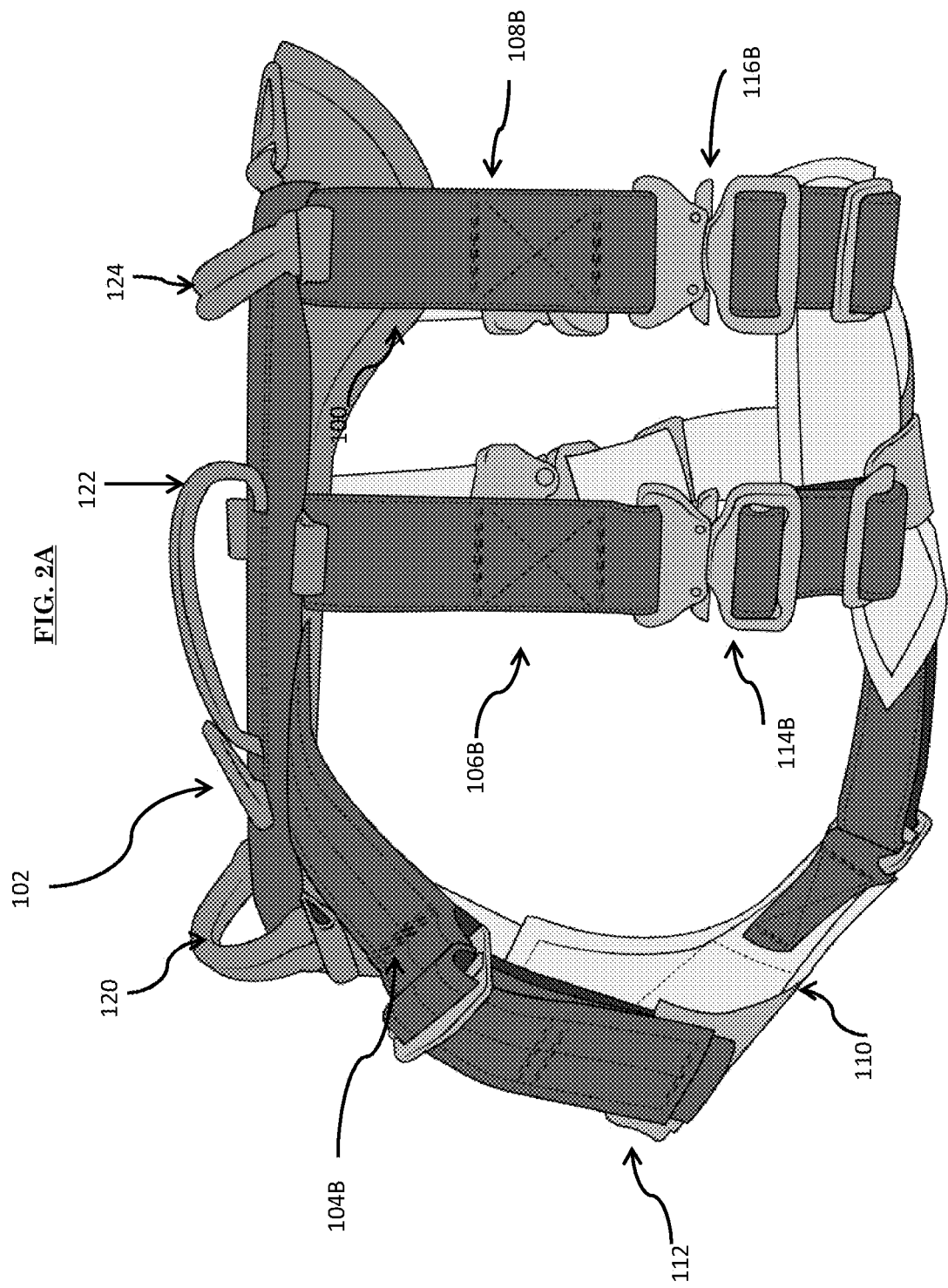
FIG. 2A is a drawing of a frame of the interchangeable harness system, according to at least one embodiment of the present disclosure.

Referring now to FIG. 2A, there is shown the interchangeable harness system 100, without the cape 150, according to at least one embodiment of the present disclosure. The upper frame 102 includes an upper chest strap 104, an upper girth strap 106, and an upper rib strap 108. In at least one embodiment of the present disclosure, the bottom frame 110 includes a bottom chest strap 112, a bottom girth strap 114, and a bottom rib strap 116.

In at least one embodiment of the present disclosure, the upper frame 102 and bottom frame 110 are configured to be mated with each other via the plurality of straps—the upper chest strap 104 mates with the bottom chest strap 112; the upper girth strap 106 mates with the bottom girth strap 114; and, the upper rib strap 108 mates with the bottom rib strap 116, as further disclosed herein. It will be appreciated that although the present embodiment is disclosed with three pairs of straps, it is within the scope of this present disclosure that the upper frame 102 and bottom frame 110 may include any numbers of strap pairings, to additionally support the interchangeable harness system 100 when harnessed to a dog. It will be further appreciated that upper frame 102 and bottom frame 110 may include only the chest and girth strap pairings, in at least one embodiment of the present disclosure.

It will be appreciated that the mating of upper frame 102 and bottom frame 110 creates the structural frame of the interchangeable harness system 100. It will be further appreciated that the upper frame 102 and bottom frame 110 may feature any fastening mechanisms well known to one having ordinary skill in the art.

In at least one embodiment of the present disclosure, the interchangeable harness system 100 includes a forward carry strap 120, a middle carry strap 122 and a rear carry strap 124. It will be appreciated that each of the forward carry strap 120, the middle carry strap 122, and the rear carry strap 124 are stitched to the upper frame 102 to allow for the lifting and carrying of the interchangeable harness system 100 and any dog strapped therein.

Figure 2B:
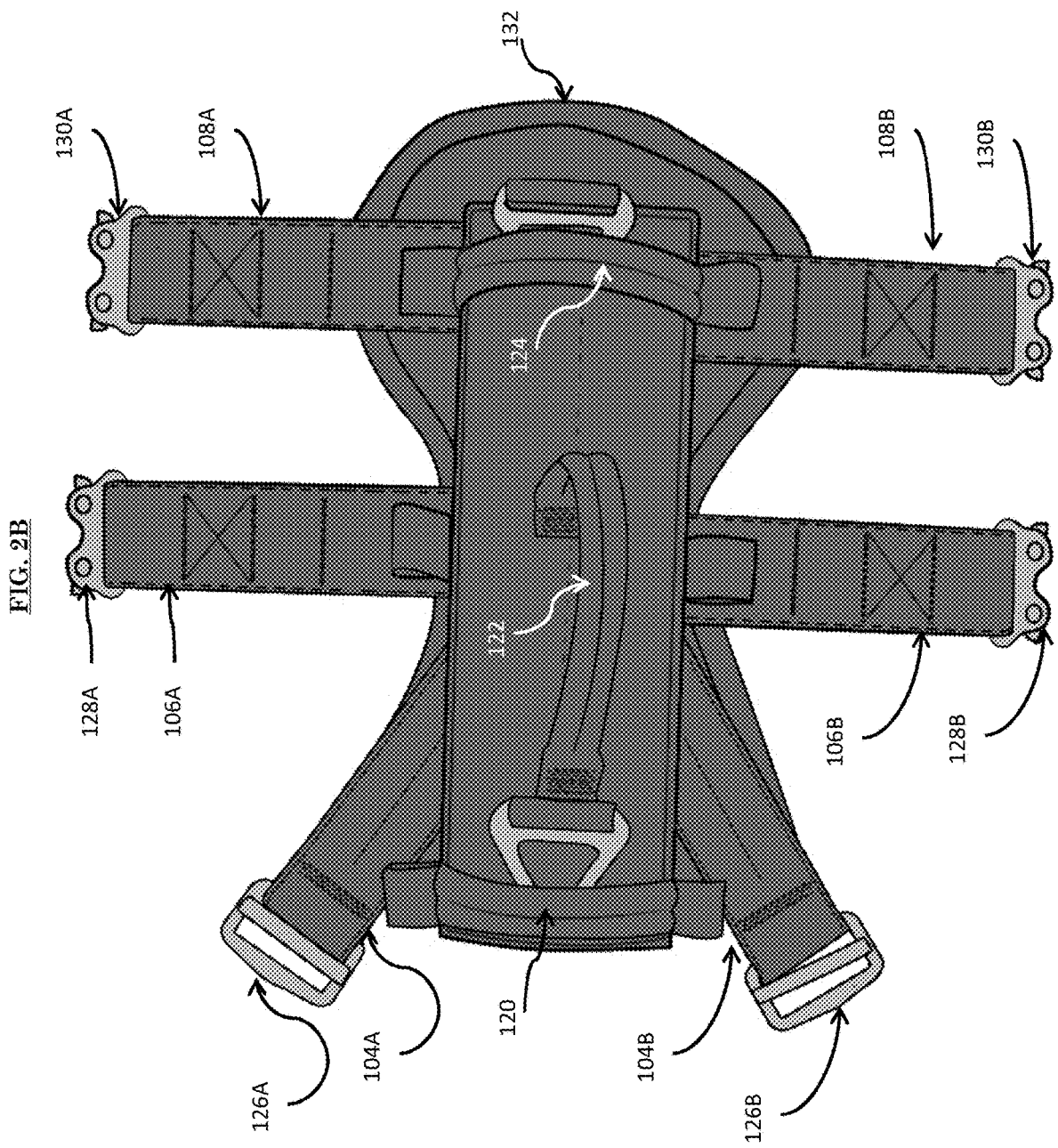
FIG. 2B is a drawing of the top view of the upper portion of the frame of the interchangeable harness system, according to at least one embodiment of the present disclosure.

Referring now to FIG. 2B, there is shown a top view of the upper frame 102, according to at least one embodiment of the present disclosure. The upper frame 102 includes a right upper chest strap 104A, a left upper chest strap 104B, a right upper girth strap 106A, a left upper girth strap 106B, a right upper rib strap 108A, and a left upper rib strap 108A. The each of the right straps and lefts straps form a strap pair. For example, the right upper chest strap 104A and the left upper chest strap 104B form an upper chest strap pair; the right upper girth strap 106A, and the left upper girth strap 106B form a upper girth strap pair; and, the right upper rib strap 108A and the left upper rib strap 108A form a upper rib strap pair. It will be appreciated that each of the upper straps may be symmetrically opposed to each other, as shown in FIG. 2B. to ensure optimal enclosure of the upper frame 102 around the body of a dog enclosed therein. It will be further appreciated that each of the upper straps include a plurality of coupling mechanisms 126A, 126B, 128A, 128B, 130A, and 130B.

In at least one embodiment of the present disclosure, the upper frame 102 further includes a main body 132, to which the each of the right upper chest strap 104A, the left upper chest strap 104B, the right upper girth strap 106A, the left upper girth strap 106B, the right upper rib strap 108A, and the left upper rib strap 108A, is affixed thereto.

Referring now to FIG. 2C, there is shown an underside view of the upper frame 102, according to at least one embodiment of the present disclosure. In at least one embodiment of the present disclosure, the main body 132 further includes a coupling strip 118, the coupling strip 118 traversing the length of the main body 132. It will be appreciated that the coupling strip 118 may include such well known materials such as hook and loop materials (e.g. Velcro®), to name one, non-limiting example.

Figure 2D:
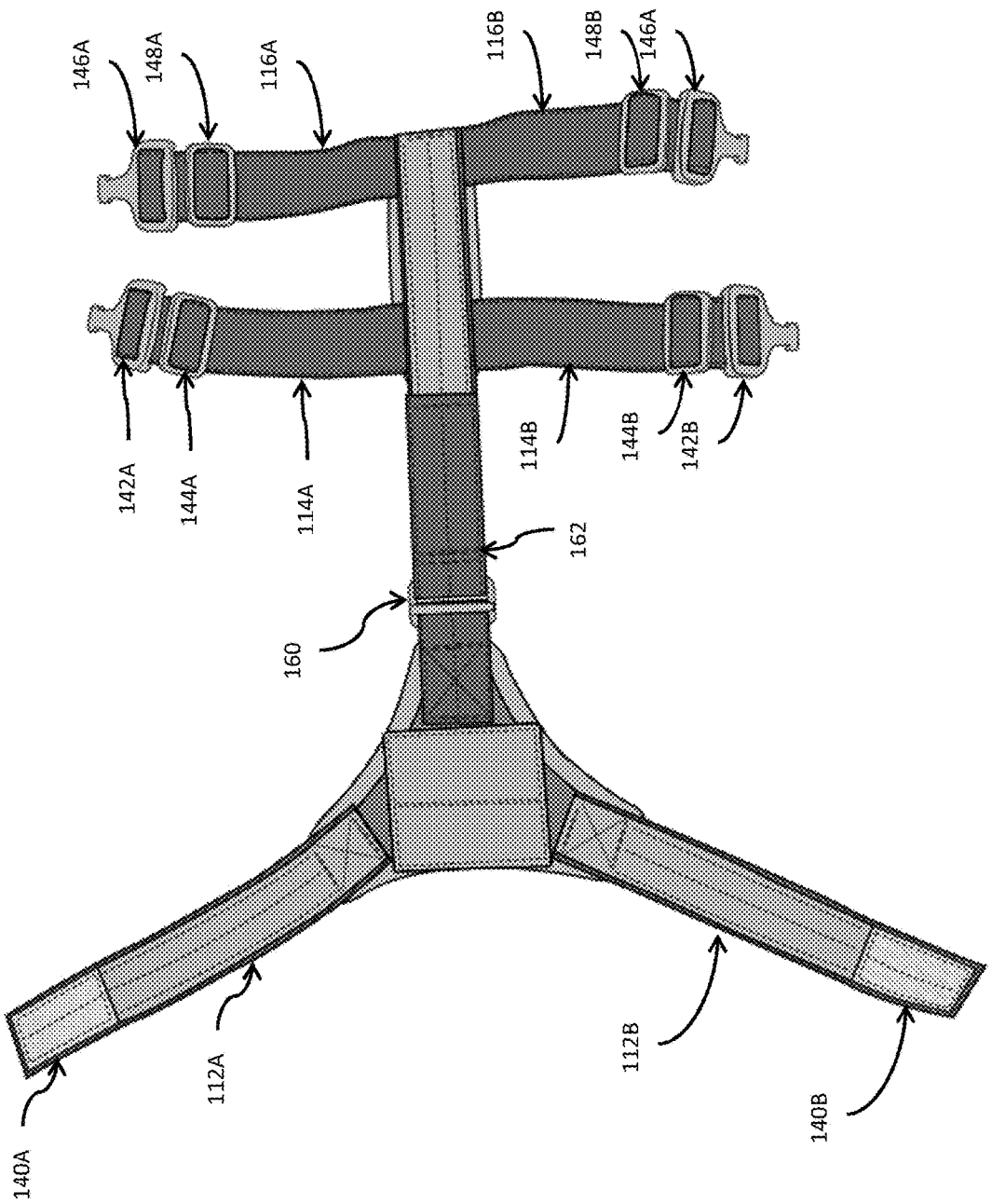
FIG. 2D is a drawing of the bottom portion of the frame of the interchangeable harness system, according to at least one embodiment of the present disclosure.

Referring now to FIG. 2D, there is shown a drawing of the bottom frame 110, according to at least one embodiment of the present disclosure. In at least one embodiment of the present disclosure, the bottom frame 110 includes, bottom right chest strap 112A, bottom left chest strap 112B, a bottom right girth strap 114A, a bottom left girth strap 114B, a bottom right rib strap 116A, a bottom left rib strap 116B, and a bottom main body 162, which may include a coupling mechanism 160 in a non-limiting example. The each of the right straps and lefts straps form a strap pair. For example, the bottom right chest strap 112 and bottom left chest strap 112B form a bottom chest strap pair; the bottom right girth strap 114A and the bottom left girth strap 114B form a bottom girth strap pair; and the bottom right rib strap 116A and bottom left rib strap 116B form a bottom rib strap pair.

In at least one embodiment of the present disclosure, the bottom frame 110 further includes a bottom right coupling mechanism 140A, a bottom left coupling mechanism 140B, a bottom right middle coupling mechanism 142A, a bottom left middle coupling mechanism 142B, a bottom right rear coupling mechanism 146A, a bottom left rear coupling mechanism 146B.

In at least one embodiment of the present disclosure, the each of the bottom right girth strap 114A, the bottom left girth strap 114B, the bottom right rib strap 116A, and the bottom left rib strap 116B, are adjustable and extendable via the loop and buckle mechanisms 144A, 144B, 148A, and 148B, respectively. It will be appreciated that the each of the bottom right girth strap 114A, the bottom left girth strap 114B, the bottom right rib strap 116A, and the bottom left rib strap 116B, are adjustable to accommodate varying girth and rib cage sizes of the dogs harnessed therein.

Figure 2E:
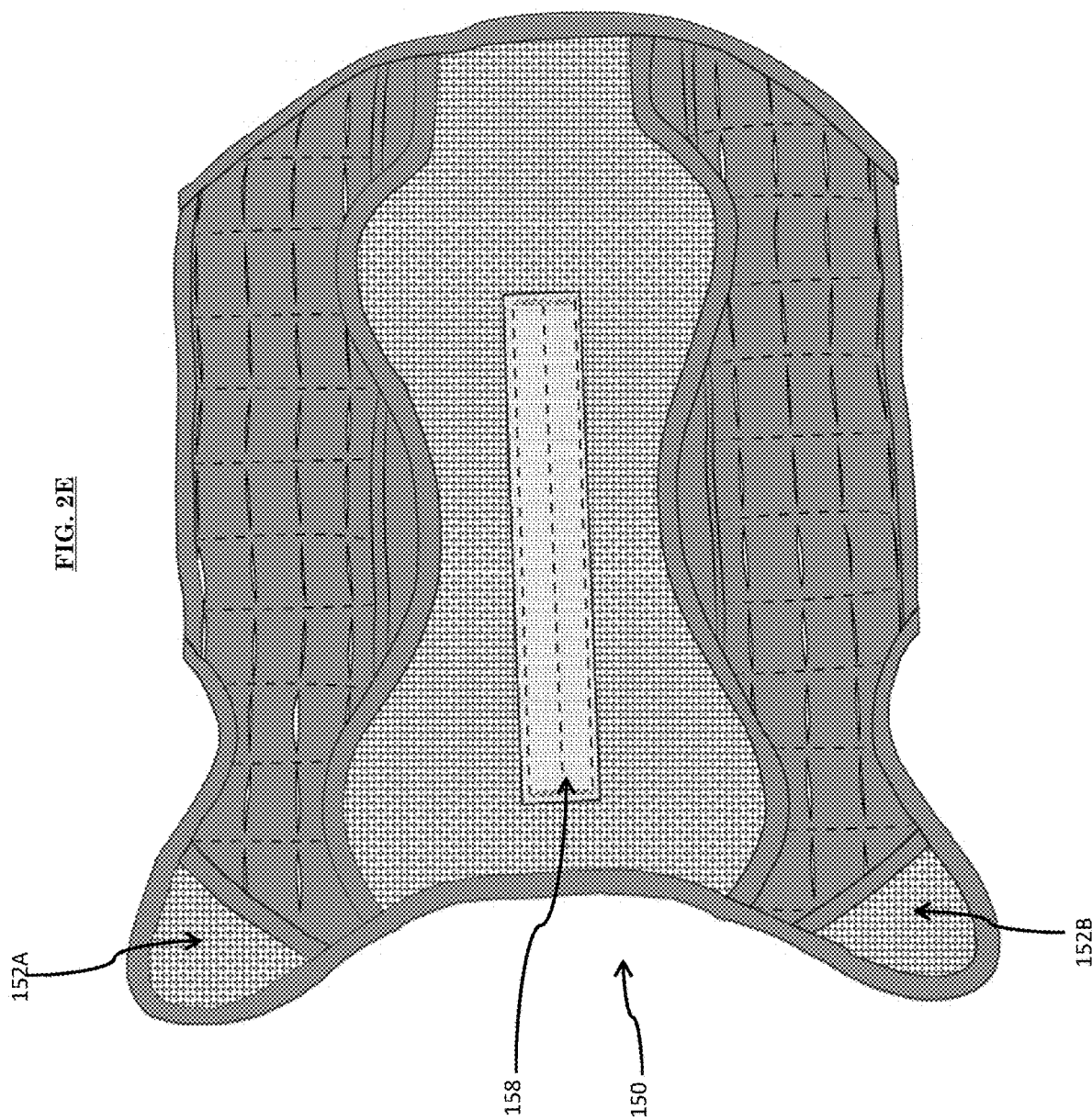
FIG. 2E is a drawing of the cape of the interchangeable harness system, according to at least one embodiment of the present disclosure.

Referring now to FIG. 2E, there is shown a top view of the cape 150, according to at least one embodiment of the present disclosure. The cape 150 includes a pair of chest slots 152A and 152B, and coupling strip 158. In at least one embodiment of the present disclosure, each of the pair of chest slots 152A and 152B are constructed to receive lower chest straps 112A and 112B, respectively, as further disclosed herein. In at least one embodiment of the present disclosure the coupling strip 158 is paired with coupling strip 118 of the upper frame 102, as further disclosed herein.

Figure 2F:
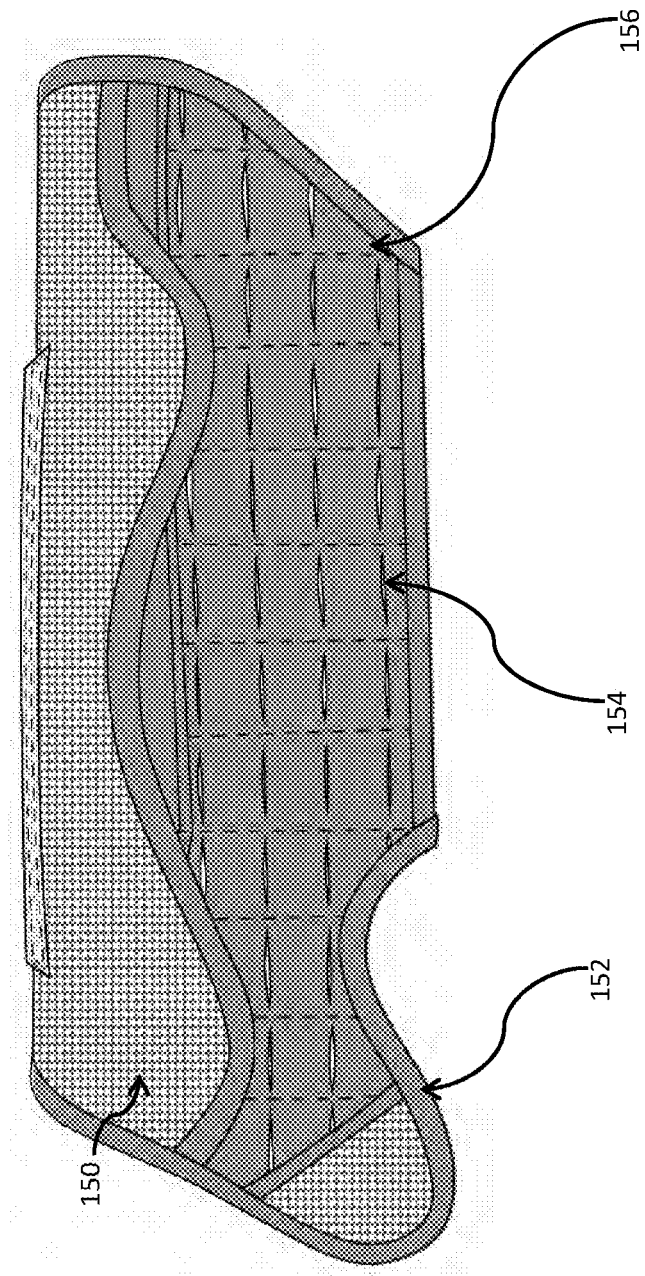
FIG. 2F if a drawing of a side view of the cape of the interchangeable harness system, according to at least one embodiment of the present disclosure.

Referring now to FIG. 2F, there is shown a perspective view of the cape 150, according to at least one embodiment of the present disclosure. In at least one embodiment of the present disclosure, the cape 150 includes a chest slot 152, a middle slot 154, and a rear slot 156. It will be appreciated that the each of the chest slot 152, a middle slot 154, and a rear slot 156 are constructed to allow passage of the upper chest strap 104, the upper girth strap 106, and the upper rib strap 108 therethrough.

It will be appreciated that each one of various embodiments of the cape 150 is constructed to meet the demands of at least one of a variety of different situations that a dog may encounter. By way of examples, the cape 150 can be constructed as a ballistics-proof vest, a carrying pack for hauling cargo, a service dog identification marker, a heating and/or cooling pack, a buoyance compensatory (e.g., flotation) device, comfort-providing material (e.g., a compression jacket), an identification marker demonstrating military or law enforcement affiliation, or even fashion, to name a few, non-limiting examples. It will be further appreciated that the cape 150 is constructed to be easily removable for cleaning purpose, or swapping with other capes 150 for use in different situations.

It will be appreciated that the cape 150 is interchangeable in the system 100, thereby allowing for a variety of cape types to be used, but with the same upper frame 102 and bottom frame 110. It will be further appreciated that the interchangeability of the cape to accommodate varying situational needs, but maintaining use of the upper frame 102 and bottom frame 110, allows for cost savings and efficiency in the interchangeable harness system 100.

Figure 3A:
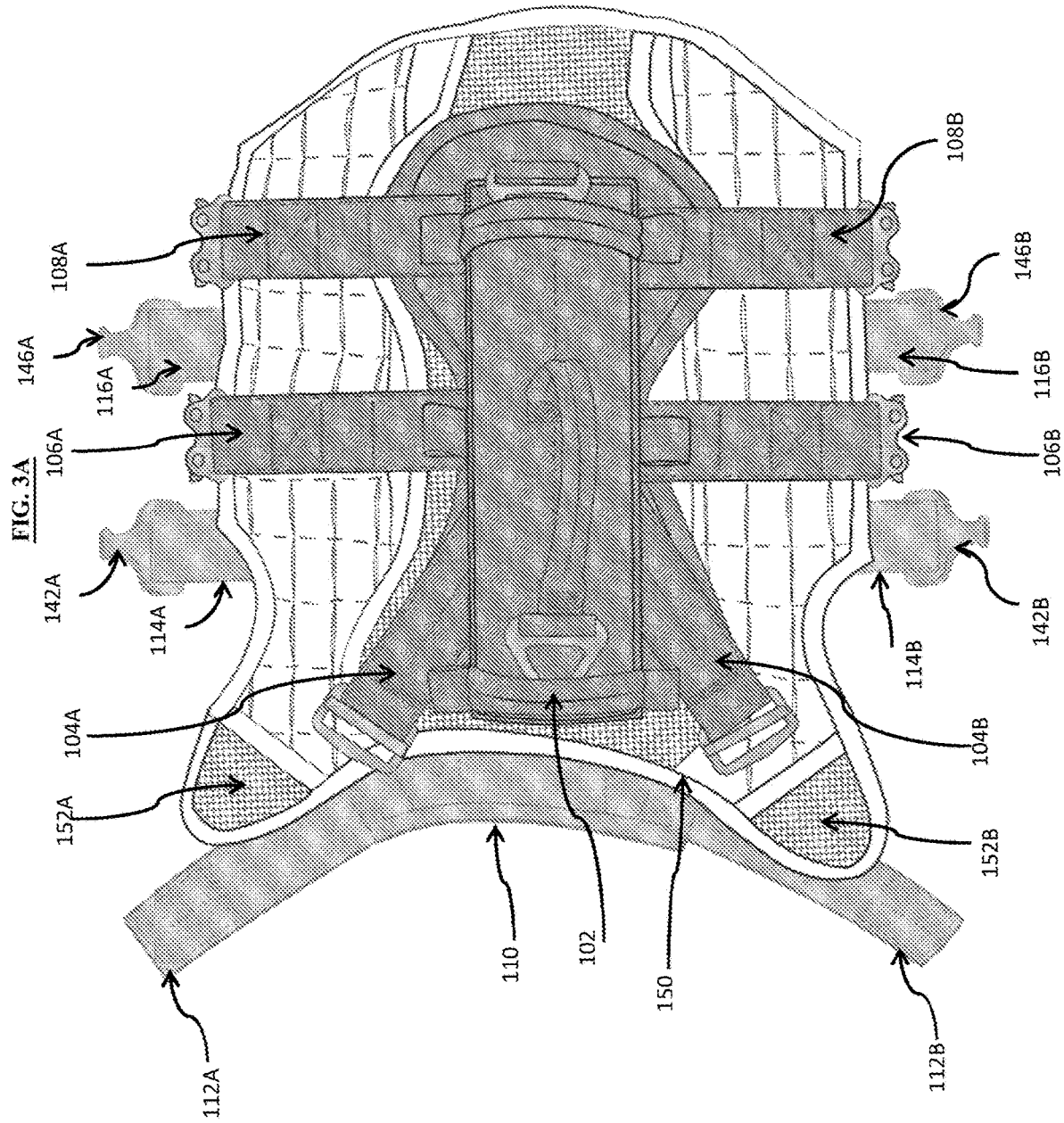
FIG. 3A is a top view of the interchangeable harness system, according to at least one embodiment of the present disclosure.
Figure 3B:
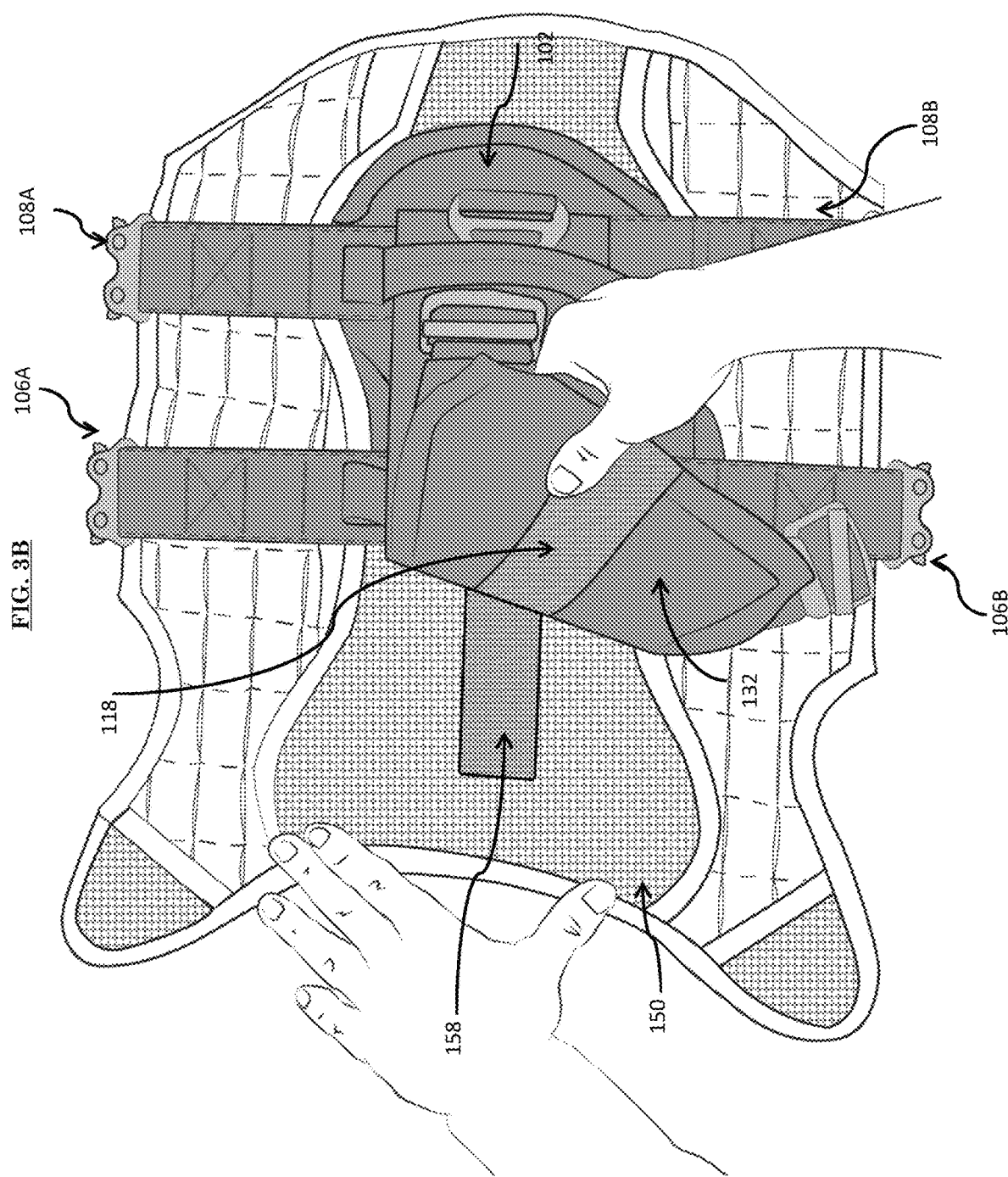
FIG. 3B is another top view of the interchangeable harness system, according to at least one embodiment of the present disclosure.

Referring now to FIG. 3A, there is shown an alternate, top view of the assembly of the interchangeable harness system 100, according to at least one embodiment of the present disclosure. In at least on embodiment of the present disclosure, the upper frame 102, is placed on top of the cape 150, followed by the bottom frame 110 beneath the cape 150, prior to assembling the harness 100. It will be appreciated that the upper frame 102 and cape 150 may be joined via the use of a temporary fastening mechanism, such as, for example, Velcro®. For example, referring to FIG. 3B, there is shown the upper frame 102 laid on top of cape 150 in a longitudinal axis along the center of the upper frame 102 and cape 150, whereby the upper frame 102 has a coupling strip 118 on the underside of frame 102, constructed to mate with a coupling strip 158 on the top side of the cape 150. It will be appreciated that the coupling strips 118 and 158 extend along the length of the bottom (or top) of the upper frame 102 and top (or bottom) of the cape 150, respectively, to allow for the upper frame 102 and the cape 150 to be affixed to each other.

Referring now to FIG. 3C, there is shown an exemplary embodiment of fastening the bottom left chest strap 112B, according to at least one embodiment of the present disclosure. The bottom left chest strap 112B is drawn through the chest slot 152B and into the coupling mechanism 126B at the distal end of the upper chest strap 104B (not shown). The bottom left chest strap 112B is subsequently folded over the coupling mechanism 126B and the coupling mechanism 140B is attached to the bottom left chest strap 112B as shown in FIG. 3D. The bottom left chest strap 112B is folded over, and then drawn back through the chest slot 152B. It will be appreciated that the bottom left chest strap 112B may be adjusted to accommodate varying dog sizes such that the bottom left chest strap 112B can comfortably wrap around the neck of the dog.

It will be appreciated that the foregoing fastening steps are applicable to the bottom right chest strap 112A, that is drawn through the chest slot 152A and into the buckle at the distal end of the upper chest strap 104A, after which the bottom right chest strap 112A is folded over the buckle at the distal end of the upper chest strap 104A, and then drawn back through the chest slot 152A.

Figure 4:
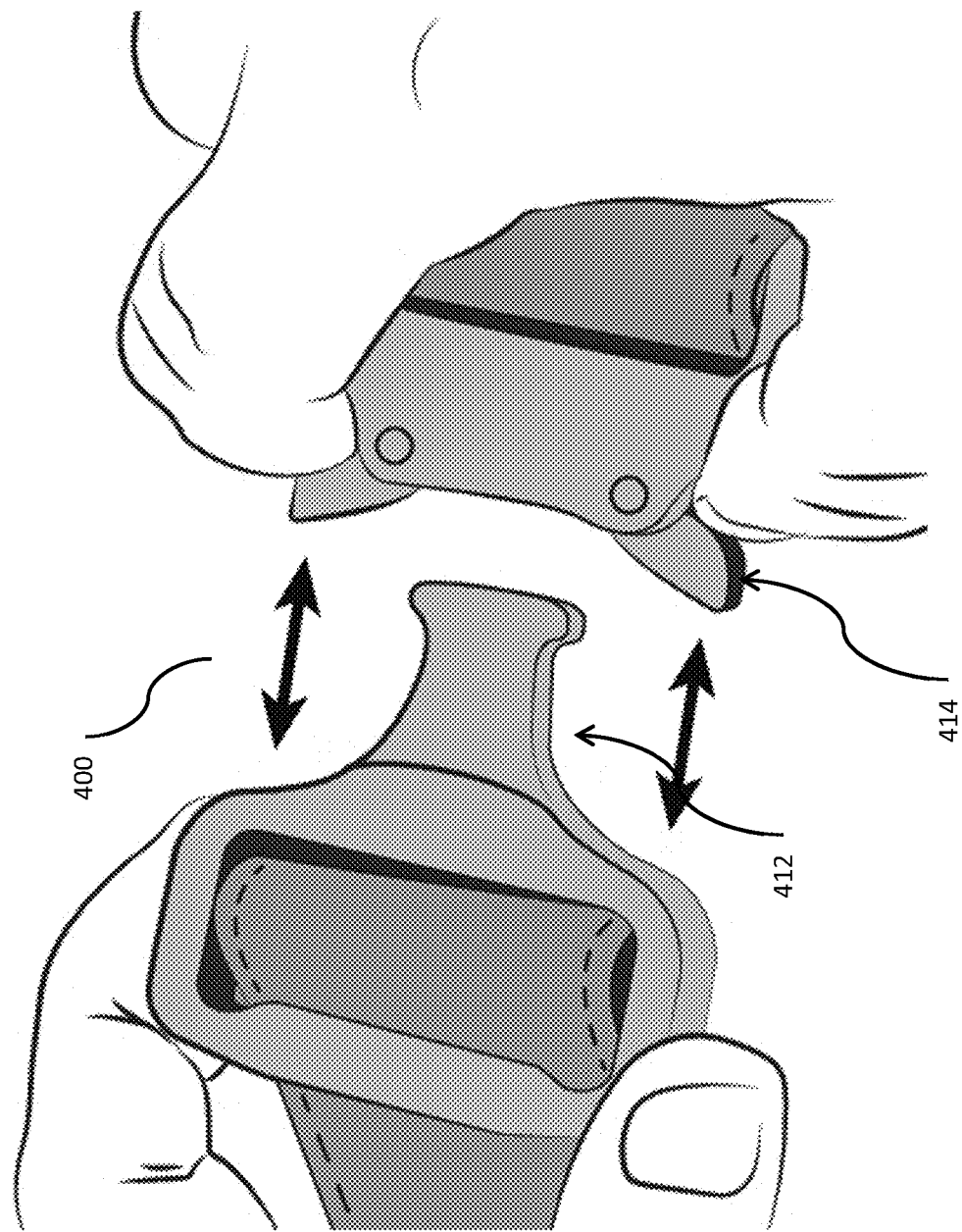
FIG. 4 is a drawing of a buckle of the interchangeable harness system, according to at least one embodiment of the present disclosure.

Referring now to FIG. 4, there is shown a buckle 400 used to fasten the straps of the interchangeable harness system 100, according to at least one embodiment of the present disclosure. The buckle 400 comprises a male end 412 and a female end 414. It will be appreciated that the buckle 400 allows for quick release and locking thereby allowing for easy and efficient fastening and releasing of the straps of the interchangeable harness system 100.

It will be appreciated that the overall design of the interchangeable harness system 100 allows for quick, efficient, and easy changes of capes, thereby allowing the harness system to be re-usable in a variety of situations.

While the disclosure has been illustrated and described in detail in the drawings and foregoing description, the same is to be considered as illustrative and not restrictive in character, it being understood that only certain embodiments have been shown and described and that all changes and modifications that come within the spirit of the disclosure are desired to be protected.

What is claimed is:

1. An interchangeable harness system configured for mounting on an animal, the system comprising:
   a top frame, comprising a body portion, a first coupling member, a top chest strap pair, and a top girth strap pair;
   a bottom frame, comprising a bottom chest strap pair and a bottom girth strap pair; and
   a removable cape member, comprising:
   a first layer,
   a second layer that overlays the first layer, the second layer comprising a left side and a right side separated by a gap; and
   a second coupling member that extends longitudinally along a centerline of the cape member and within the gap of the second layer;
   wherein a chest slot pair and a middle slot pair are formed between the first layer and the second layer,
   wherein, when the system is mounted on the animal:
   the bottom frame is positioned beneath the cape member,
   the first layer of the cape member contacts the back of the animal,
   the body portion of the top frame is disposed on top of the first layer, within the gap of the second layer, and the first coupling member engages with the second coupling member to secure the top frame onto the cape member;
   the chest slot pair is positioned to align with the animal's chest area, the top chest strap pair extends from the body portion, over the first layer, through the chest slot pair, and fastens with the bottom chest strap pair, the top girth strap pair extends from the body portion, over the first layer, through the middle slot pair, and fastens with the bottom girth strap pair, and the system is configured to enable distribution of load across the animal's body.

2. The interchangeable harness system of claim 1, wherein the top frame further comprises a top rib strap pair, the bottom frame further comprises a bottom rib strap pair, and the removable cape member comprises a rear slot pair.

3. The interchangeable harness system of claim 2 wherein the top rib strap pair is drawn through the rear slot pair and operably fastened to the bottom rib strap pair.

4. The interchangeable harness system of claim 1 wherein the cape member is interchangeable with at least one second cape member, wherein the second cape member comprises a cape member chest slot pair and a cape member middle slot pair.

5. The interchangeable harness system of claim 4, wherein each of the at least one second cape members further comprise a rear slot pair.

6. The interchangeable harness system of claim 1 wherein the cape member is selected from a group consisting of a ballistics-proof vest, a carrying pack for hauling cargo, a service dog identification marker, a heating pack, a cooling pack, a buoyancy compensatory device, a comfort-providing material, an identification marker demonstrating military or law enforcement affiliation.

7. The interchangeable harness system of claim 1 wherein the top frame further comprises one or more of a forward carry strap, a middle carry strap, and a rear carry strap.

\* \* \* \* \*